United States Patent

Miyamura et al.

(10) Patent No.: US 10,344,640 B2
(45) Date of Patent: Jul. 9, 2019

(54) OIL STRAINER SUPPORT STRUCTURE FOR INTERNAL COMBUSTION ENGINE

(71) Applicant: HONDA MOTOR CO., LTD., Tokyo (JP)

(72) Inventors: Takuya Miyamura, Wako (JP); Hodaka Mukohara, Wako (JP); Tomokazu Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/895,089

(22) Filed: Feb. 13, 2018

(65) Prior Publication Data

US 2018/0283245 A1 Oct. 4, 2018

(30) Foreign Application Priority Data

Mar. 30, 2017 (JP) .................. 2017-069174

(51) Int. Cl.

| F01M 11/03 | (2006.01) |
|---|---|
| F01M 11/04 | (2006.01) |
| B01D 35/30 | (2006.01) |
| B01D 35/00 | (2006.01) |
| F01M 11/06 | (2006.01) |
| B01D 35/027 | (2006.01) |
| F01M 1/10 | (2006.01) |

(52) U.S. Cl.
CPC ........... *F01M 11/03* (2013.01); *B01D 35/005* (2013.01); *B01D 35/0276* (2013.01); *B01D 35/306* (2013.01); *F01M 11/0458* (2013.01); *F01M 11/06* (2013.01); *B01D 2201/306* (2013.01); *B01D 2201/347* (2013.01); *F01M 2001/1078* (2013.01)

(58) Field of Classification Search
CPC .... F01M 11/03; F01M 11/06; F01M 11/0458; B01D 35/005

See application file for complete search history.

(56) References Cited

U.S. PATENT DOCUMENTS

| 3,211,291 A | 10/1965 | Teutsch |
|---|---|---|
| 2015/0090216 A1* | 4/2015 | Hatae .................. B01D 35/005 |
| | | 123/196 R |

FOREIGN PATENT DOCUMENTS

| EP | 1055803 | 11/2000 |
|---|---|---|
| JP | H05-075414 U | 10/1993 |
| JP | 2005-9346 A * | 1/2005 |
| JP | 2007-224823 A | 9/2007 |
| JP | 4414329 | 2/2010 |
| JP | 2012-117481 A | 6/2012 |

OTHER PUBLICATIONS

Japanese Office Action with English Translation dated Nov. 13, 2018, 8 pages.
German Office Action dated Feb. 5, 2019 with English translation, 34 pages.

* cited by examiner

*Primary Examiner* — Kevin A Lathers
(74) *Attorney, Agent, or Firm* — Rankin, Hill & Clark LLP

(57) ABSTRACT

An oil strainer support structure for an internal combustion engine capable of improving the maintainability of an oil strainer is provided. In an oil strainer support structure for an internal combustion engine having an oil strainer, the oil strainer is supported by a drain bolt provided in the internal combustion engine. The oil strainer can be detached by removing the drain bolt to improve maintainability.

6 Claims, 9 Drawing Sheets

OIL STRAINER SUPPORT STRUCTURE FOR INTERNAL COMBUSTION ENGINE

INCORPORATION BY REFERENCE

The present application claims priority under 35 U.S.C. § 119 to Japanese Patent Application No. 2017-069174 filed on Mar. 30, 2017. The content of the application is incorporated herein by reference in its entirety.

TECHNICAL FIELD

The present invention relates to an oil strainer support structure for an internal combustion engine.

BACKGROUND ART

Conventionally, there has been known an oil strainer structure for filtering an oil accumulated in an oil pan in an internal combustion engine in which the oil strainer is supported by the oil pan to fix the oil strainer to the engine (For example, refer to Patent Literature 1).

CITATION LIST

Patent Literature

[Patent Literature 1] Japanese Patent No. 4414329

SUMMARY OF INVENTION

Technical Problem

In Patent Literature 1, because of the structure in which the oil strainer is supported by the oil pan, it is difficult to remove the oil pan for the purpose of maintaining the oil strainer, resulting in a problem in maintainability.

An object of the present invention is to provide an oil strainer support structure for an internal combustion engine capable of improving the maintainability of an oil strainer.

Solution to Problem

In order to solve the above problem, an aspect of the present invention provides an oil strainer support structure for an internal combustion engine having an oil strainer (147), in which the oil strainer (147) is supported by a drain bolt (135) that is provided in the internal combustion engine (10).

In the aspect of the present invention, an outer diameter (D1) of the oil strainer (147) may be smaller than an inner diameter (D2) of an internal thread of a threaded hole (29s) to which the drain bolt (135) is screwed.

Also, according to the aspect of the present invention, the drain bolt (135) may have a support portion (135d) for supporting the oil strainer (147), and the support portion (135d) may be provided with an opening (135f).

Further, according to the aspect of the present invention, the internal combustion engine (10) may be provided with a baffle (29g) for preventing undulation of an oil surface of oil, the baffle (29g) may be provided with an opening (29t), and the oil strainer (147) may pass through the opening (29t).

Further, according to the aspect of the present invention, an oil inlet (151d) of the oil strainer (147) may be provided with an annular flange (153b), and a filter (154) for reducing suction of a foreign matter may be fitted to the flange (153b).

Further, according to the aspect of the present invention, the drain bolt (135) may be provided, with a hollow portion (135g) that opens a leading end of the drain bolt (135), the filter (154) may be inserted in the hollow portion (135g) of the drain bolt (135), and the leading end of the drain bolt (135) may be abutted against the flange (153b).

Further, according to the aspect of the present invention, an oil inflow port (29p) may be formed in a crankcase (11) in order to connect one end portion of the oil strainer (147) to an oil passage of the crankcase (11), and an inner diameter of the opening (29t) may be larger than a maximum inner diameter of the inflow port (29p).

Further, according to the aspect of the present invention, the oil inlet (151d) of the oil strainer (147) may be provided between a pair of convex portions (29v, 29v) provided on a bottom of the crankcase (11).

Advantageous Effects of Invention

Since the oil strainer of the aspect of the present invention is supported by the drain bolt provided in the internal combustion engine, the oil strainer can be easily detached by merely removing the drain bolt, and the maintainability can be improved.

According to the aspect of the present invention, since the outer diameter of the oil strainer is smaller than the inner diameter of the internal thread of the threaded hole to which the drain bolt is screwed, the oil strainer can be detached from the threaded hole of the drain bolt to an outside, thereby being capable of more easily performing the maintenance.

Further, according to the aspect of the present invention, since the drain bolt has a support portion for supporting the oil strainer, and the support portion is provided with the opening, the suction amount of oil can be ensured by the opening of the support portion.

Further, according to the aspect of the present invention, the internal combustion engine is provided with the baffle for reducing the undulation of the oil surface of the oil, the opening is provided in the baffle, and the oil strainer passes through the opening. Therefore, the opening of the baffle can be leveraged as a guide for installing the oil strainer.

Further, according to the aspect of the present invention, the annular flange is provided at the oil inlet of the oil strainer and the filter for reducing the suction of the foreign matter is attached to the flange. Therefore, the filter can be attached simultaneously at the time of forming the flange and the productivity can be improved.

Further, according to the aspect of the present invention, the drain bolt is provided with the hollow portion that opens the leading end of the drain bolt, the filter is inserted into the hollow portion of the drain bolt, and the leading end of the drain bolt is abutted against the flange. Therefore, the flange supported by the drain bolt supports the filter so that there is no need to specially provide the filter support portion, and the costs can be reduced.

Further, according to the aspect of the present invention, the oil inflow port is formed in the crankcase in order to connect one end portion of the oil strainer to the oil passage of the crankcase, and the inner diameter of the opening is larger than the maximum inner diameter of the inflow port. Therefore, the oil strainer can be guided by the opening and easily inserted into the inflow port, and a guide performance can be improved.

Further, according to the aspect of the present invention, since the oil inlet of the oil strainer is provided in the pair of convex portions provided on the bottom of the crank case, an oil reservoir can be formed between the convex portions around the oil strainer, and the oil can be efficiently suctioned into the oil strainer.

DESCRIPTION OF EMBODIMENTS

Hereinafter, an embodiment of the present invention will be described with reference to the drawings. In the description, directions such as front and back, right and left, and up and down are identical with directions of a vehicle body unless otherwise stated. In the respective drawings, a reference symbol FR designates a front of the vehicle body, a reference symbol UP designates an upper side of the vehicle body, and a reference symbol LH designates a left side of the vehicle body.

Figure 1:
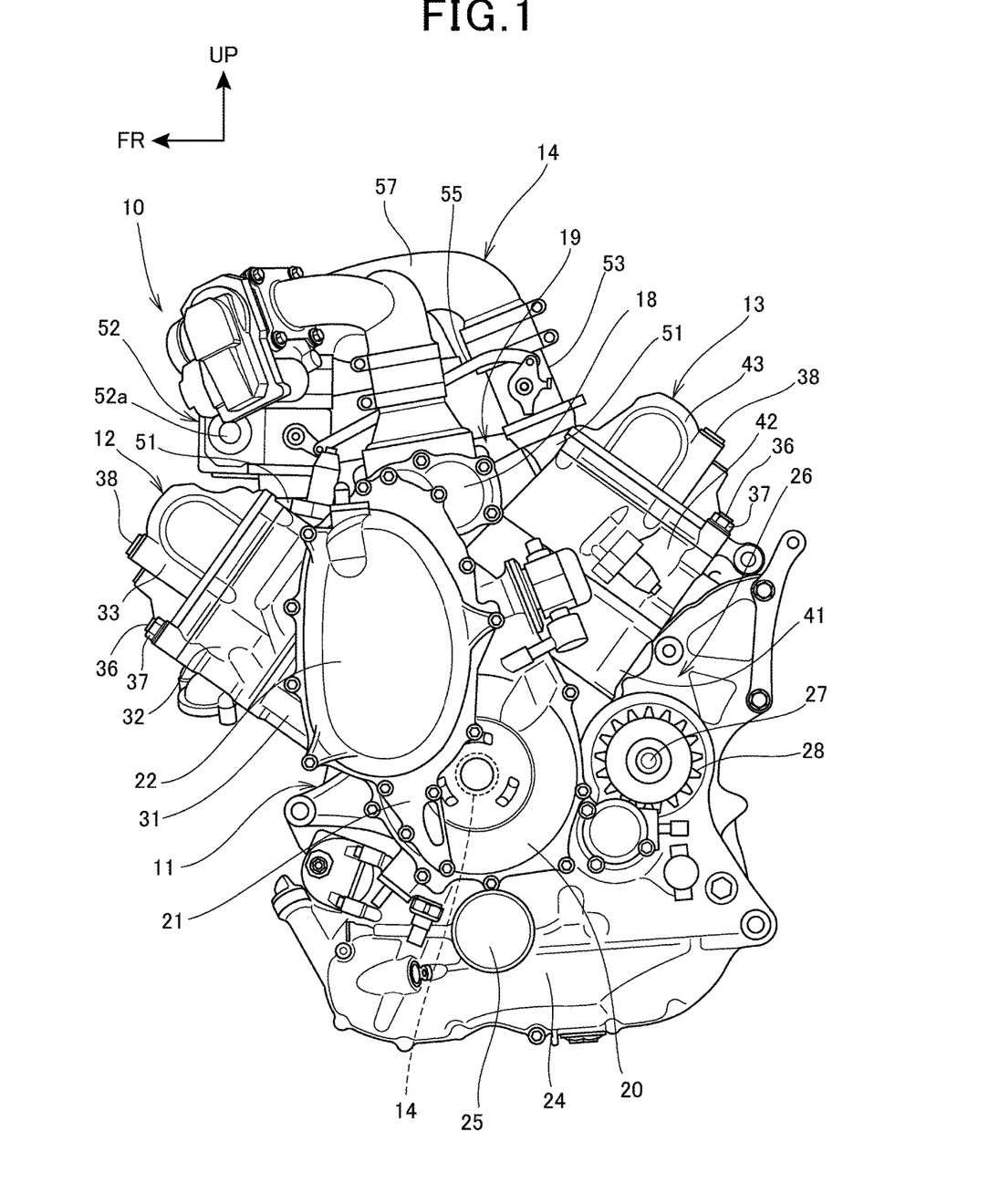
FIG. 1 is a left side view of an internal combustion engine provided with an oil strainer support structure according to the present invention.

FIG. 1 is a left side view of an internal combustion engine 10 having an oil strainer support structure according to the present invention.

The internal combustion engine 10 is a V type mounted on a motorcycle and includes a crankcase 11, a front cylinder portion 12, and a rear cylinder portion 13. The front cylinder portion 12 extends obliquely upward forward of a vehicle from an upper portion of the crankcase 11. The rear cylinder portion 13 extends obliquely upward rearward of the vehicle from the upper portion of the crankcase 11. The front cylinder portion 12 and the rear cylinder portion 13 are disposed in a V shape.

In the internal combustion engine 10, an intake device 14 is connected to a rear portion of the front cylinder portion 12 and a front portion of the rear cylinder portion 13, and an exhaust device (not shown) is connected to a front portion of the front cylinder portion 12 and a rear portion of the rear cylinder portion 13.

The intake device 14 includes a supercharger 18. The supercharger 18 is driven by a power of a crankshaft 16. The crankshaft 16 is accommodated in the crankcase 11. The supercharger 18 is disposed in a space 19. The space 19 is defined between a rear surface of the front cylinder portion 12 and a front surface of the rear cylinder portion 13.

An ACG cover 20 is attached to a left side surface of the crankcase 11. The ACG cover 20 covers a side of an AC generator (ACG: AC generator). The AC generator is provided around the crankshaft 16. Furthermore, a side cover 21 is attached to the ACG cover 20. A supercharger driving mechanism (not shown) is accommodated in the side cover 21. The supercharger driving mechanism transmits a power from the crankshaft 16 to the supercharger 18 to drive the supercharger 18.

A breather cover 22 is attached to an upper portion of the side cover 21. The breather cover 22 defines a breather chamber (not shown). A blow-by gas in the crankcase 11 passes through the breather chamber. In the breather chamber, a liquid oil is separated from the blow-by gas.

An oil filter 25 is attached to a lower portion of the crankcase 11.

A transmission 26 is integrally provided at a rear portion of the crankcase 11. The transmission 26 includes an output shaft 27 and a drive sprocket 28. The output shaft 27 protrudes sideways from a side surface of the crankcase 11. The drive sprocket 28 is attached to the output shaft 27. The drive sprocket 28 is connected to a driven sprocket through a chain. The driven sprocket is provided on a rear wheel side of the motorcycle. As a result, a driving force is transmitted from the transmission 26 to the rear wheel.

The front cylinder portion 12 includes a front cylinder block 31, a front cylinder head 32, and a front head cover 33. The front cylinder block 31, the front cylinder head 32, and the front head cover 33 are attached to the crankcase 11 in this order. The front cylinder block 31 and the front cylinder head 32 are fastened to the crank case 11 by multiple stud bolts 36 and multiple nuts 37. The front head cover 33 is fastened to the front cylinder head 32 by multiple bolts 38.

The rear cylinder portion 13 includes a rear cylinder block 41, a rear cylinder head 42 and a rear head cover 43. The rear cylinder block 41, the rear cylinder head 42 and the rear head cover 43 are attached to the crankcase 11 in this order. The rear cylinder block 41 and the rear cylinder head 42 are fastened to the crankcase 11 by multiple stud bolts 36 and multiple nuts 37. The rear head cover 33 is fastened to the rear cylinder head 42 by multiple bolts 38.

The intake device 14 includes two intake pipes 51, a TBW throttle device 52, a throttle device 53, a connecting tube 57, and the supercharger 18.

The front cylinder head 32 is provided with an intake pipe 51, and the intake pipe 51 is connected with the TBW throttle device 52. The TBW throttle device 52 includes an electric motor 52a and a throttle valve (not shown). The throttle valve is driven by the electric motor 52a. The electric motor 52a and the throttle valve are components configuring the TBW which will be described below.

The TBW (throttle by wire) is a system that detects the rotation of a throttle grip provided on a motorcycle with a sensor, transmits a detection signal of the sensor to the electric motor 52a through a conductor, and opens and closes the throttle valve with the electric motor 52a.

The intake pipe 51 is provided in the rear cylinder head 42 and the throttle device 53 is connected to the intake pipe 51. The throttle device 53 includes another throttle valve (not shown) that is opened and closed in conjunction with the throttle valve of the TBW throttle device 52. Both of those throttle valves are connected to each other by a rod 55.

The TBW throttle device 52 and the throttle device 53 are connected with respective bifurcated ends of the connecting tube 57. In addition, the supercharger 18 is connected to an end of the connecting tube 57 at a middle portion of the connecting tube 57.

The supercharger 18 is connected with an air cleaner through a connecting tube (not shown) on an upstream side of the supercharger 18.

Figure 2:
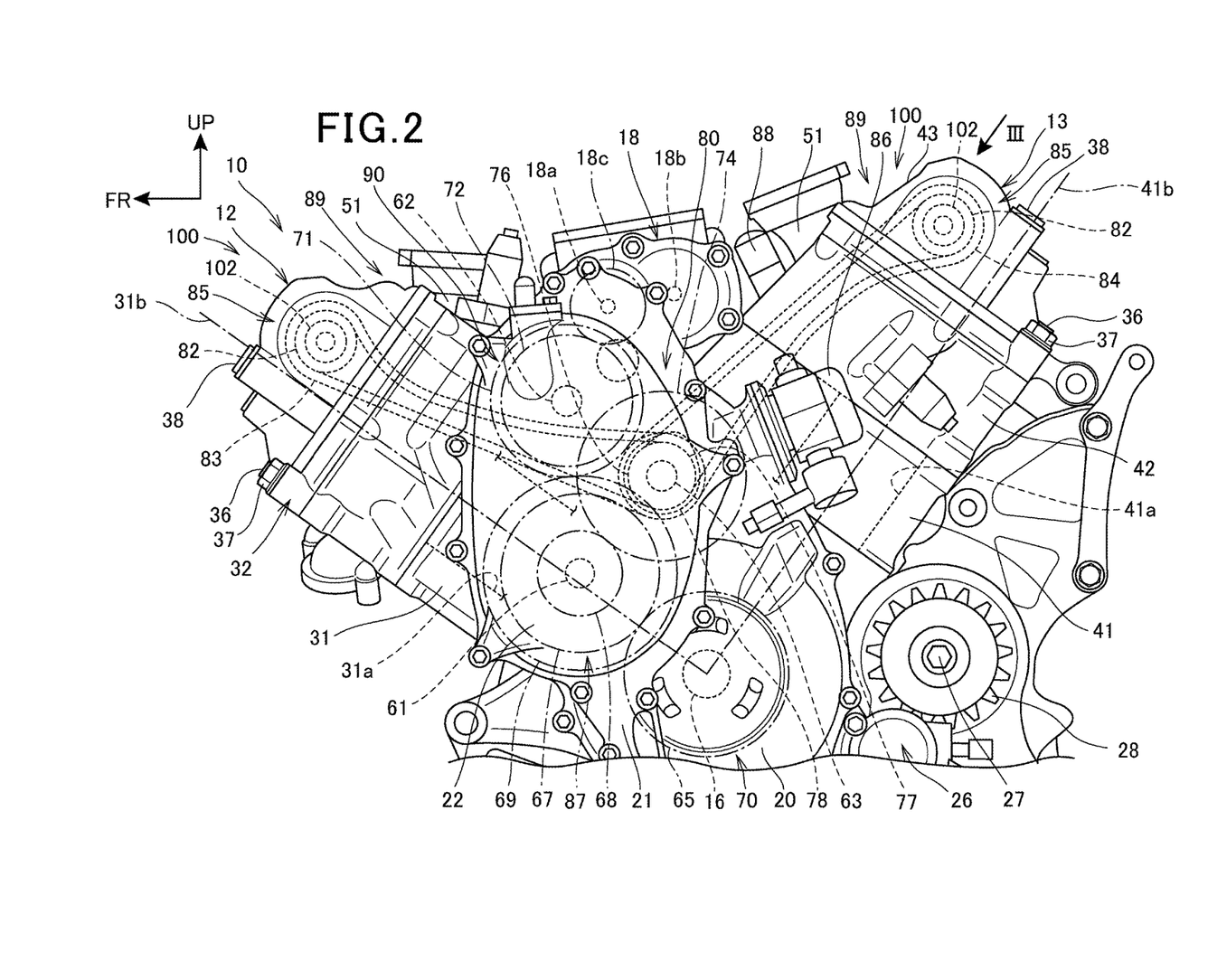
FIG. 2 is an enlarged view of a main portion in FIG. 1.

FIG. 2 is an enlarged view of a main portion in FIG. 1.

The front cylinder block 31 and the rear cylinder block 41 internally include cylindrical cylinders 31a and 41a, respectively, and a piston is movably inserted into each of the cylinders 31a and 41a. An angle formed between cylinder axis lines 31b and 41b is 90°. The cylinder axis lines 31b and 41b pass through centers of the cylinders 31a and 41a, respectively.

A pair of intermediate shafts 61 and 62, and a drive shaft 63 are rotatably supported by the crankcase 11. The pair of intermediate shafts 61 and 62 is located inside the breather cover 22. The drive shaft 63 is located above the crankshaft 16.

The crankshaft 16 is provided with a main drive gear 65.

One intermediate shaft 61 is provided with a first intermediate gear 67, a second intermediate gear 68, and a third intermediate gear 69. The first intermediate gear 67 meshes with the main drive gear 65. The second intermediate gear 68 has a diameter smaller than that of the first intermediate gear 67. The third intermediate gear 69 has a diameter larger than that of the first intermediate gear 67.

The other intermediate shaft 62 is provided with a fourth intermediate gear 71 and a fifth intermediate gear 72. The fourth intermediate gear 71 meshes with the third intermediate gear 69. The fifth intermediate gear 72 has a diameter smaller than that of the fourth intermediate gear 71.

The drive shaft 63 is provided with a sub driving gear 74 meshed with the second intermediate gear 68, a pair of first timing sprocket 76 and second timing sprocket 77, and a cam 78. The sub driving gear 74 meshes with the second intermediate gear 68.

A cam shaft 102 is rotatably supported by each of the front cylinder head 32 and the rear cylinder head 42, and a cam sprocket 82 is provided on each cam shaft 102 of the front cylinder head 32 and the rear cylinder head 42.

A first timing chain 83 is hooked on the first timing sprocket 76 and the cam sprocket 82 of the front cylinder head 32 and a second timing chain 84 is hooked on the second timing sprocket 77 and the cam sprocket 82 of the rear cylinder head 42.

The supercharger 18 has a pair of rotor shafts 18a and 18b disposed in parallel, and a rotor (not shown) is attached to each of the rotor shafts 18a and 18b. One rotor shaft 18a is provided with a rotor shaft gear 18c. The rotor shaft gear 18c meshes with the fifth intermediate gear 72. A high pressure fuel pump 86 is attached to a rear portion of the ACG cover 20. The high pressure fuel pump 86 operates by leveraging a power of the drive shaft 63.

The high pressure fuel pump 86 is driven by rotation of the cam 78. The cam 78 is provided on the drive shaft 63. A fuel that has been pressurized by the high pressure fuel pump 86 is injected to respective combustion chambers of the front cylinder portion 12 and the rear cylinder portion 13 through fuel injection valves 88 (only one fuel injection valve 88 shown). The respective fuel injection valves 88 are disposed in the front cylinder head 32 and the rear cylinder head 42.

Figure 3:
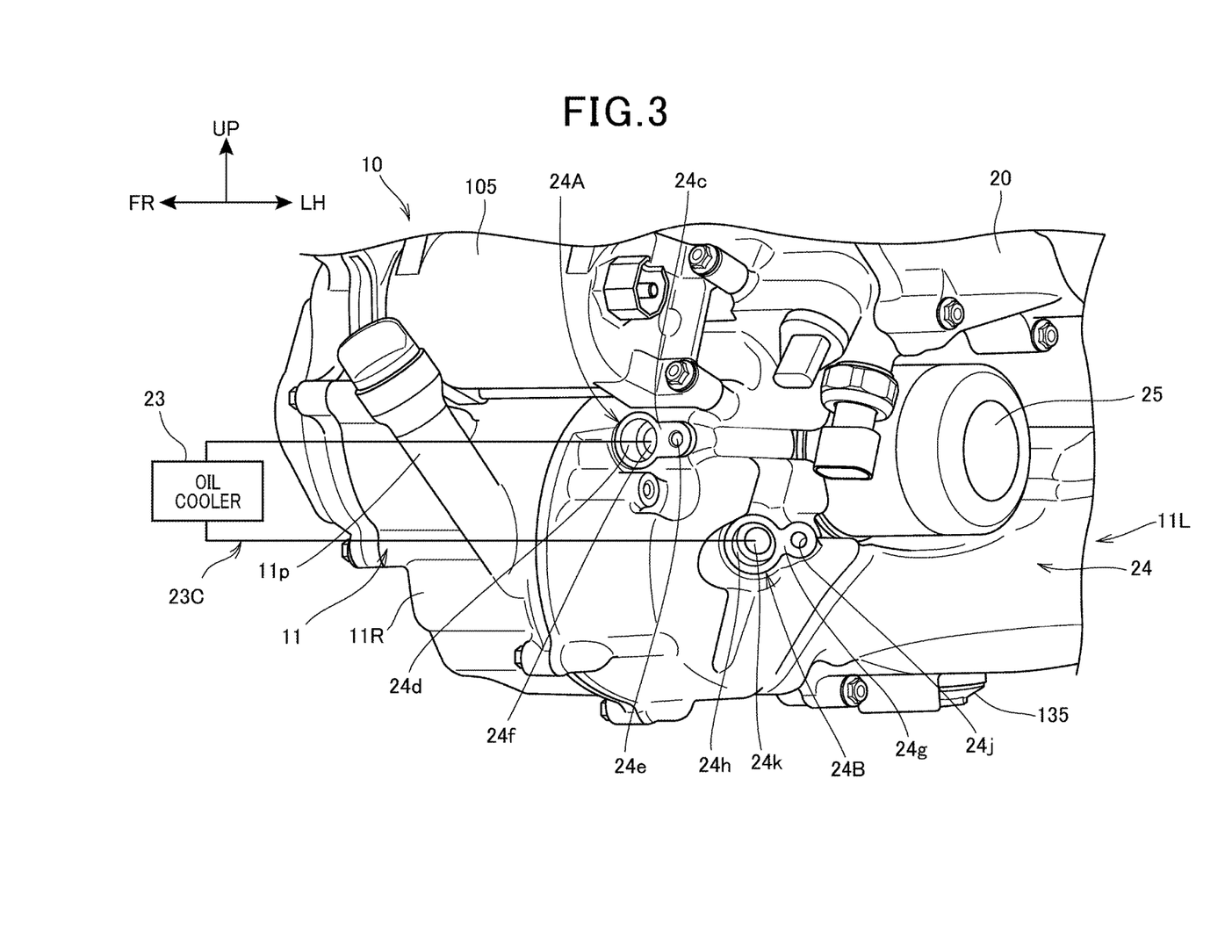
FIG. 3 is a perspective view showing a lower portion of the internal combustion engine.

FIG. 3 is a perspective view showing a lower portion of the internal combustion engine 10.

The crankcase 11 includes a left crankcase 11L and a right crankcase 11R which are split into right and left parts. In this example, a lower portion of the left crankcase 11L is defined as a case lower portion 24.

A pair of front pipe connecting portion 24A and side pipe connecting portion 24B is formed in a front portion of the case lower portion 24. An oil cooler 23 is mounted on an outside of the internal combustion engine 10, for example, a front portion of a body frame of the motorcycle. A pipe is provided for allowing an oil to flow into the oil cooler 23. The pipe is connected to the front pipe connecting portion 24A and the side pipe connecting portion 24B.

The front pipe connecting portion 24A includes an end surface 24c, a downstream pipe connecting hole 24d, and a threaded hole 24e. The end surface 24c is formed at a front portion of the case lower portion 24. The downstream pipe connecting hole 24d and the threaded hole 24e are formed in the end surface 24c.

The downstream pipe connecting hole 24d is provided at an end of a downstream oil passage 24f. The downstream oil passage 24f is disposed on a downstream side of the oil flowing in the oil cooler 23. A bolt is screwed into the threaded hole 24e. The bolt is provided for fixing a pipe connected to the downstream pipe connecting hole 24a, in more detail, a joint provided on a leading end of the pipe.

The side pipe connecting portion 24B includes an end surface 24g, an upstream pipe connecting hole 24h, and a screw hole 24j. The end surface 24g is formed on a side of the case lower portion 24, and the upstream pipe connecting hole 24h and the screw hole 24j are formed in the end surface 24g.

The upstream pipe connecting hole 24h is provided at an end of an upstream oil passage 24k. The upstream oil passage 24k is provided at an upstream side of the oil flowing in the oil cooler 23. A bolt is screwed into the threaded hole 24j. The bolt is provided for fixing a pipe connected to the upstream pipe connecting hole 24h, in more detail, a joint provided at a leading end of the pipe.

The downstream oil passage 24f and the upstream oil passage 24k described above extend to an attachment portion of the oil filter 25.

The crankcase 11 to which the case lower portion 24 is attached, more specifically, the right crankcase 11R is provided with an oil inlet lip in a front portion of the right crankcase 11R.

Figure 4:
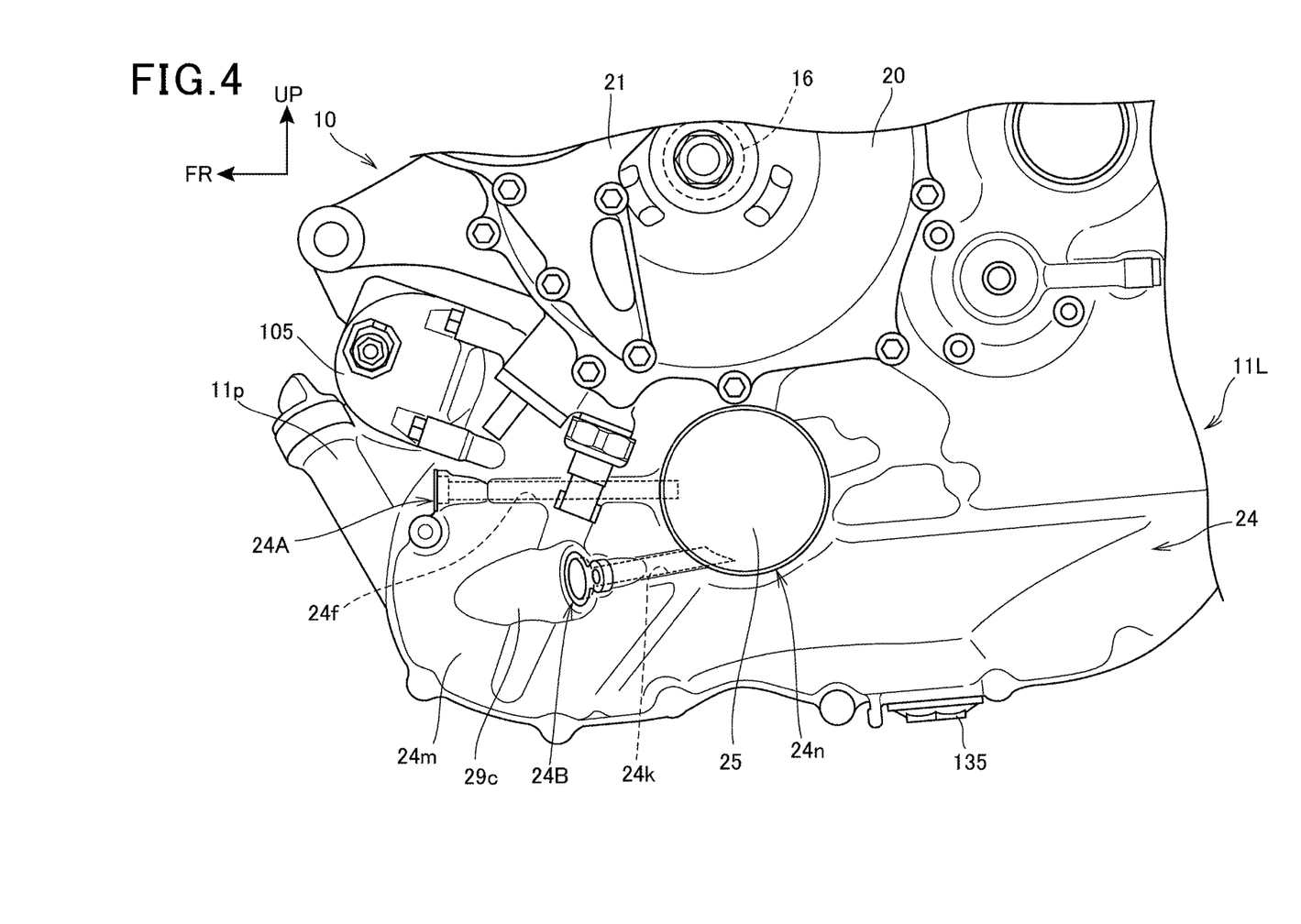
FIG. 4 is a left side view showing a lower portion of the internal combustion engine.

FIG. 4 is a left side view shewing a lower portion of the internal combustion engine 10.

A recessed portion 29c is recessed inward in a vehicle width direction. The recessed portion 29c is provided in a front portion of a side wall 24m of the case lower portion 24. A side pipe connecting portion 24B is formed in a rear portion of the recessed portion 29c.

An oil filter attachment portion 24n is positioned below the crankshaft 16 as viewed in a side. The oil filter attachment portion 24n is formed on the side wall 24m of the case lower portion 24. The oil filter 25 is attached to the oil filter attachment portion 24n.

The side wall 24m is provided with the downstream oil passage 24f and the upstream oil stream 24k. The downstream oil passage 24f communicates the front pipe connecting portion 24A and the oil filter attachment portion 24n with each other. The upstream oil passage 24k communicates the side pipe connecting portion 24B and the oil filter attachment portion 24n to each other. The downstream oil passage 24f and the upstream oil passage 24k are opened inside the oil filter attaching portion 24n.

The downstream oil passage 24f is formed so as to extend in a longitudinal direction, and the upstream oil passage 24k is formed so as to extend rearward and upward.

A drain bolt 135 is provided in a lower portion of the case lower portion 24. The drain bolt 135 discharges the oil in the case lower portion 24.

Figure 5:
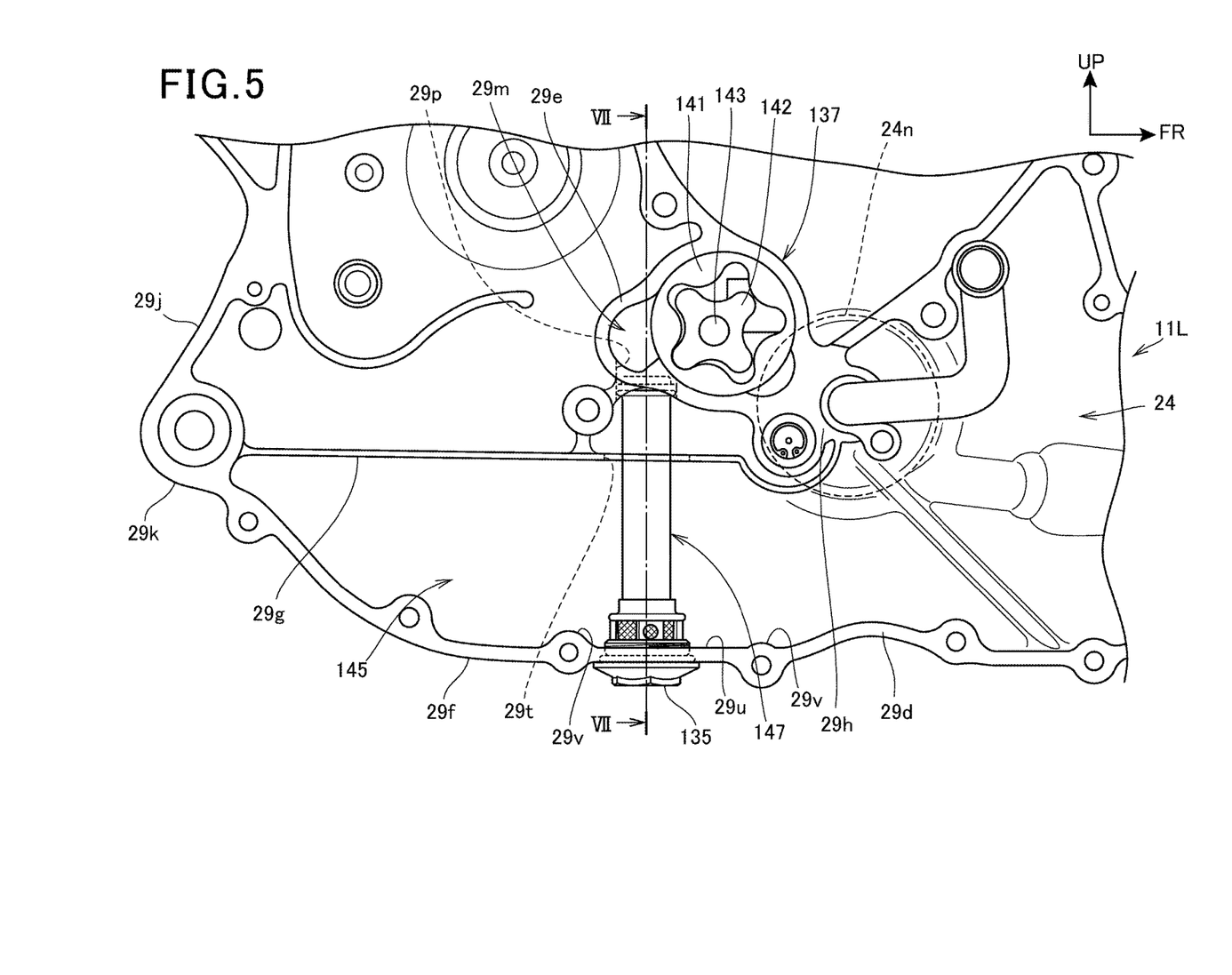
FIG. 5 is a right side view of the lower portion of the case as seen from an inside.

FIG. 5 is a right side view of the case lower portion 24 as seen from the inside.

A mating surface 29d with the right crankcase 11R (refer to FIG. 3) is formed in the case lower portion 24.

An oil pump 137 is provided on a back side (an inner side in the vehicle width direction) of the oil filter attachment portion 24n so as to overlap the oil filter attachment portion 24n as viewed in a side.

The oil pump 137 is a trochoid type, and includes a pump housing 29e, an outer rotor 141, an inner rotor 142, and a pump shaft 143. The pump housing 29e is integrally formed on the case lower portion 24. The outer rotor 141 and the inner rotor 142 are rotatably housed in the pump housing 29e. The pump shaft 143 serves as a rotary shaft of the inner rotor 142.

A partition wall 29g is integrally formed on the case lower portion 24 below the oil pump 137. The partition wall 29g partitions the case lower portion 24, more particularly, a rear portion of the case lower portion 24 into the oil pump 137 side and a bottom wall 29f side of the case lower portion 24.

The partition wall 29g is formed between an inner wall 29h and a fastening boss 29k so as to extend forward and backward. The inner wall 29h is continuous with the pump housing 29e of the oil pump 137. The fastening boss 29k is provided on a rear wall 29j of the case lower portion 24, and fastens the internal combustion engine 10 (refer to FIG. 1) to the body frame of the vehicle. An oil tank 145 is formed between the partition wall 29g and the bottom wall 29f. The oil is accumulated in the oil tank 145.

The pump housing 29e of the oil pump 137 is formed with an inflow port 29p serving as an oil inlet into a pump chamber 29m. The pump chamber 29m is formed inside the pump housing 29e. The inflow port 29p is connected with an oil strainer 147.

The oil strainer 147 removes a foreign matter contained in the oil when the oil accumulated in the oil tank 145 is drawn up by the oil pump 137.

The oil strainer 147 is supported by the pump housing 29e and the drain bolt 135. The drain bolt 135 is screwed to the bottom wall 29f. An opening 29t is provided in the partition wall 29g and the oil strainer 147 penetrates through the opening 29t.

The partition wall 29g prevents the oil accumulated in the oil tank 145 from waving up or moving to a large extent, reduces a change in height of the oil surface, and facilitates suction of the oil from the oil strainer 147.

Multiple bosses 29v are provided on the bottom wall 29f of the case lower portion 24. The multiple bosses 29v are formed so as to protrude upward from an upper surface 29u of the bottom wall 29f. The multiple bosses 29v are provided with bolt insertion holes or threaded holes. Bolts pass through the respective bolt insertion holes or screw to the respective threaded holes when the left crankcase 11L is fastened to the right crankcase 11R (refer to FIG. 3).

A pair of bosses 29v is provided anterior and posterior to the oil strainer 147. An oil inlet 151d (refer to FIG. 9) of the oil strainer 147 is located between the pair of bosses 29v.

As described above, in the oil strainer support structure for the internal combustion engine 10 (refer to FIG. 3) having the oil strainer 147 for removing the foreign matter contained in the oil, the oil strainer 147 is supported by the drain bolt 135 provided in the internal combustion engine 10. Therefore, the oil strainer 147 can be easily maintained by merely removing the drain bolt 135 so that the maintainability can be improved.

Figure 6:
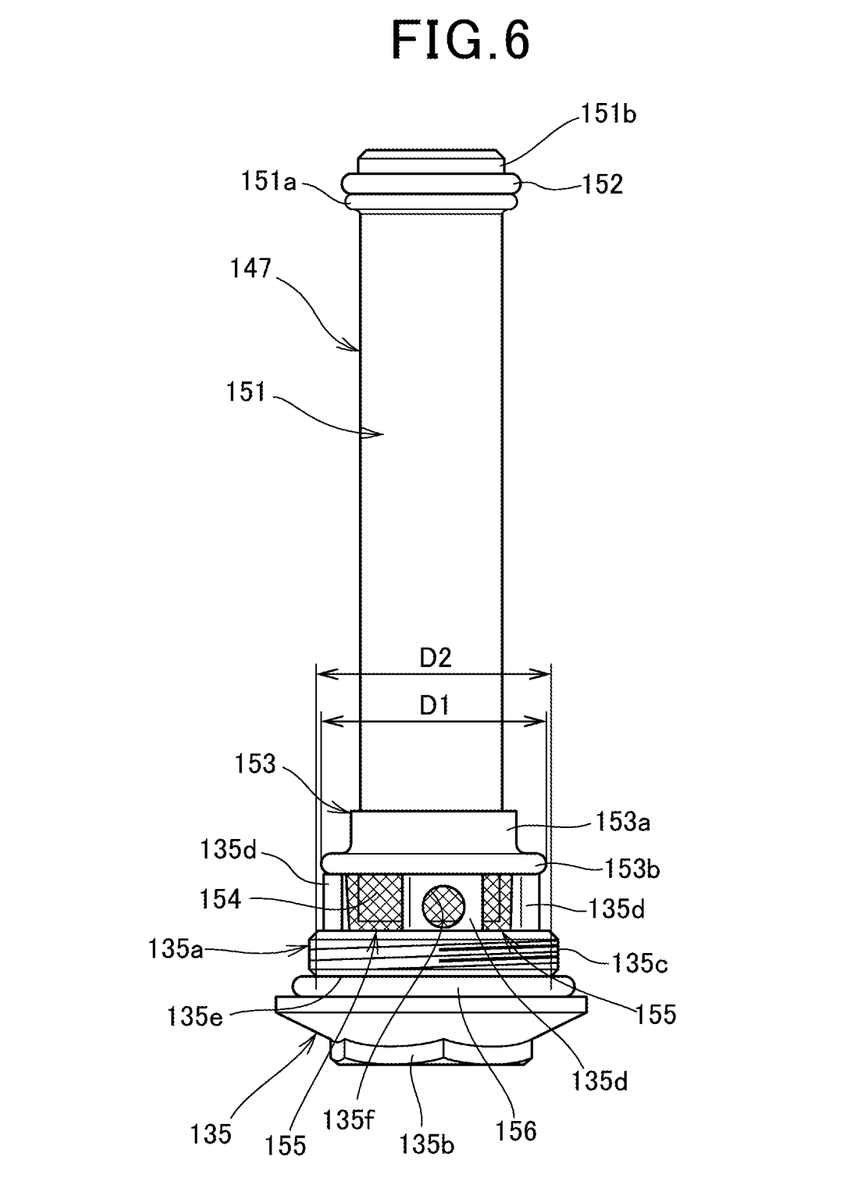
FIG. 6 is a side view showing an oil strainer and a drain bolt.

FIG. 6 is a side view showing the oil strainer 147 and the drain bolt 135.

The oil strainer 147 includes a straight pipe 151, an O-ring 152, a lower flange member 153, and a mesh filter 154. The O-ring 152 is fitted to an upper end of the pipe 151l. The lower flange member 153 is provided at a lower end of the pipe 151. The mesh filter 154 is attached to the lower flange member 153.

An upper flange 151a is integrally formed on the upper end of the pipe 151, and the O-ring 152 is fitted to the pipe 151 so as to be adjacent to the upper flange 151a.

The lower flange member 153 integrally includes a cylindrical portion 153a and a flange 153b. The cylindrical portion 153a is fitted to the pipe 151 and the flange 153b is increased in diameter from the cylindrical portion 153a.

The drain bolt 135 is abutted against the flange 153b of the lower flange member 153 from below.

An outer diameter D1 of the flange 153b is the largest among the outer diameters of the respective components of the oil strainer 147.

The mesh filter 154 is made of, for example, a wire mesh, and separates the foreign matter from the oil.

The drain bolt 135 includes a shaft 135a and a head 135b. The head 135b is formed at an end of the shaft 135a.

The shaft 135a includes an external thread 135c, pressing portions 135d, and an annular groove 135e. The external thread 135c is screwed to the case lower portion 24 (refer to FIG. 5). The pressing portion 135d projects from an end of the external thread 135c in an axial direction to press the flange 153b of the oil strainer 147. The annular groove 135e is provided between the external thread 135c and the head 135b.

An opening 135f is provided in each of the pressing portions 135d. A gap between the adjacent pressing portions 135d is an oil passage 155.

A sealing member 156 is fitted in the annular groove 135e. The sealing member 156 is preferably formed of an O-ring gasket (washer).

Figure 7:
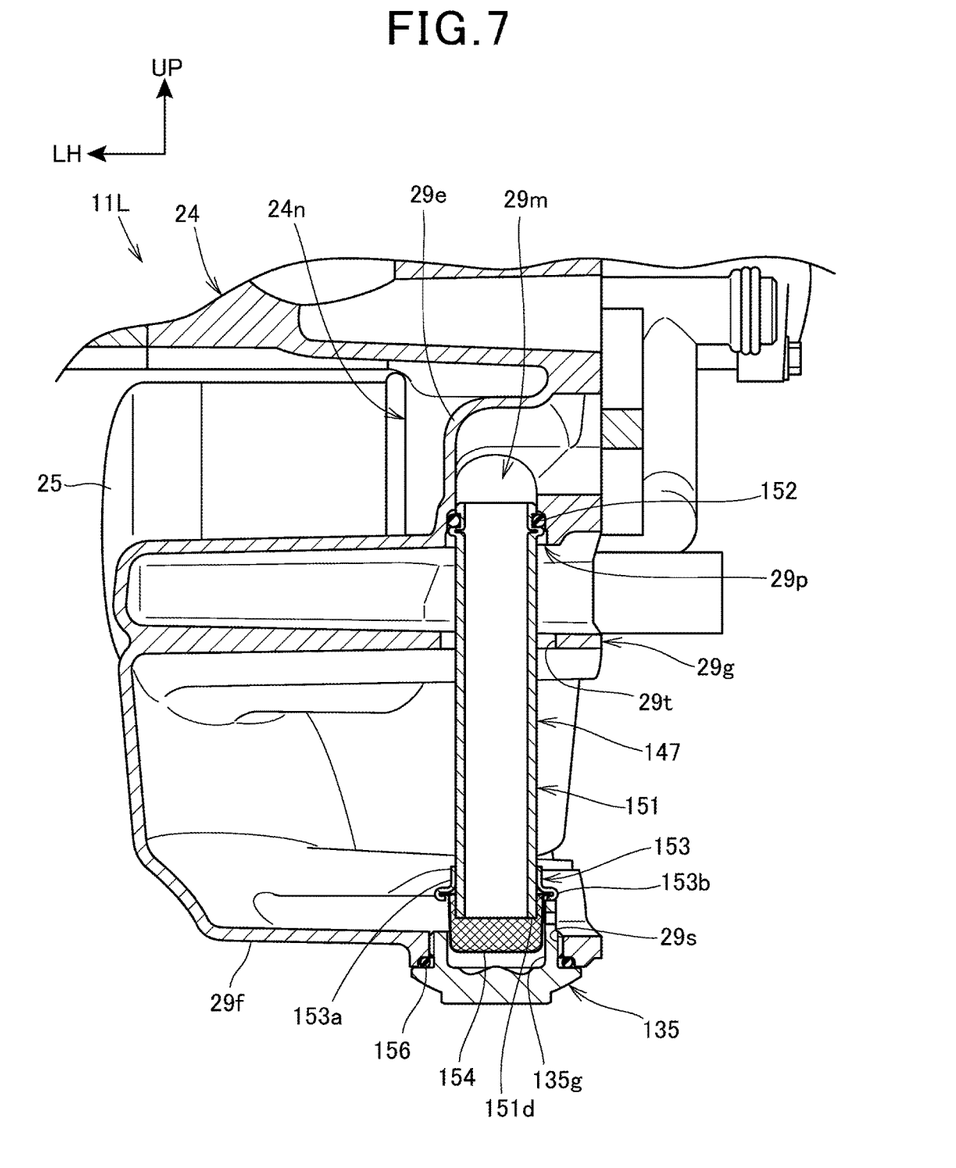
FIG. 7 is a cross-sectional view taken along a line VII-VII of FIG. 5.
Figure 8:
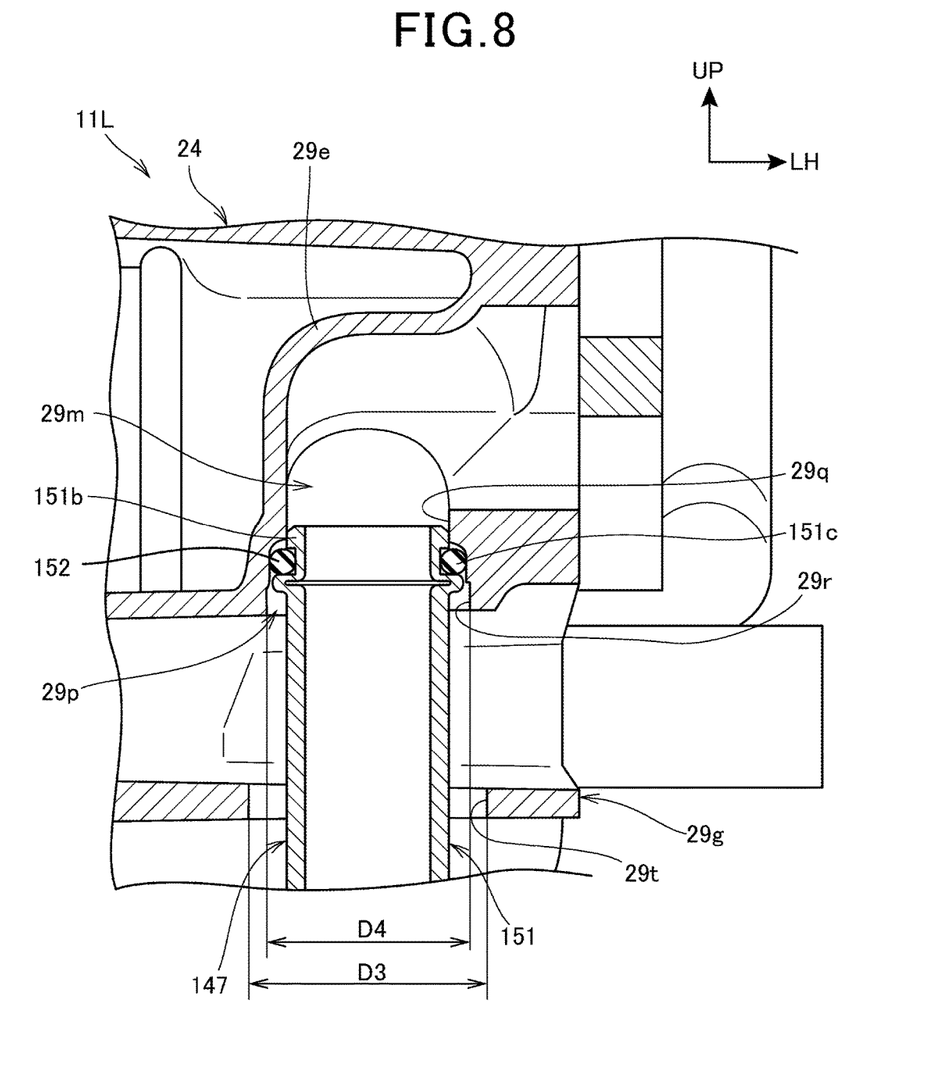
FIG. 8 is an enlarged view of an upper portion of the oil strainer and a periphery of the upper portion shown in FIG. 7.
Figure 9:
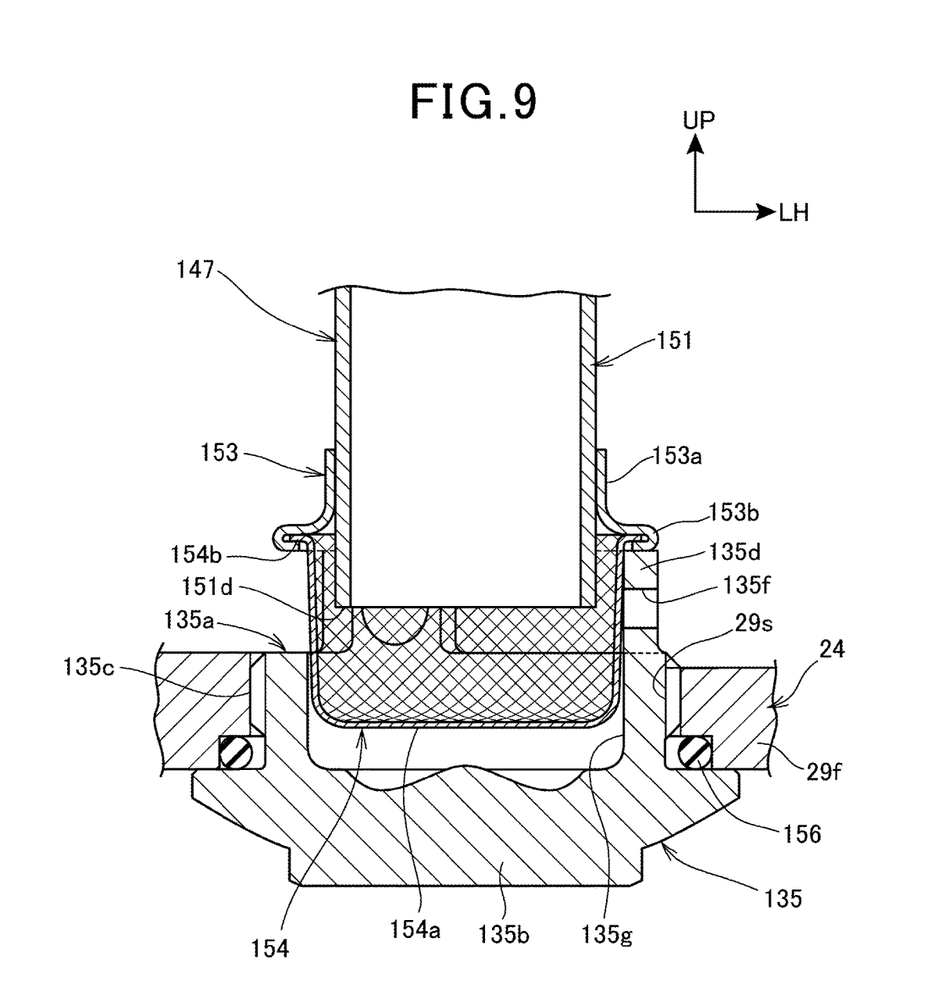
FIG. 9 is an enlarged view of a lower portion of the oil strainer, the drain bolt, and a periphery of the drain bolt shown in FIG. 7.

FIG. 7 is a cross-sectional view taken along a line VII-VII of FIG. 5, FIG. 8 is an enlarged view of an upper portion of the oil strainer 147 and a periphery of the upper portion shown in FIG. 7, and FIG. 9 is an enlarged view of a lower portion of the oil strainer 147, the dram bolt 135, and a periphery of the drain bolt 135 shown in FIG. 7.

As shown in FIGS. 7 and 8, the inflow port 29p is provided in the pump housing 29e of the case lower portion 24. The inflow port 29p vertically penetrates through the pump housing 29e.

The inflow port 29p includes a small diameter hole 29q and a large diameter hole 29r. The small diameter hole 29q faces the pump chamber 29m, and the large diameter hole 29r is formed, below the small diameter hole 29q so as to have a diameter larger than a diameter of the small diameter hole 29q.

In the oil strainer 147, an annular O-ring groove 151c is provided in a leading end 151b of the pipe 151, and the O-ring 152 is fitted in the O-ring groove 151c.

The leading end 151b of the oil strainer 147 is inserted into the small diameter hole 29q of the pump housing 29e so that the upper portion of the oil strainer 147 is positioned in the front, rear, left and right directions. The O-ring 152 of the leading end 151b of the oil strainer 147 is inserted into the large diameter hole 29r of the pump housing 29e to secure a sealability between the pump housing 29e and the upper portion of the oil strainer 147.

When it is assumed that an inner diameter of the opening 29t of the partition wall 29g is D3 and an inner diameter of the large diameter hole 29r of the inflow port 29p is D4, the inner diameter D3 is larger than the inner diameter D4. In this way, when the inner diameter D3 is set to be larger than the inner diameter D4, the oil strainer 147 can be easily inserted into the inflow port 29p while being guided by the opening 29t in assembling the oil strainer 147 to the left crankcase 11L.

As shown in FIGS. 7 and 9, a lower end of the pipe 151 serves as the oil inlet 151d that opens downward.

In the lower flange member 153 of the oil strainer 147, the cylindrical portion 153a is attached to the pipe 151 by welding or the like, and the flange 153b is crushed into a U-shaped cross section. The mesh filter 154 includes a cup portion 154a and a flange 154b. The cup portion 154a is formed in a cup shape, and the flange 154b is formed at an edge of an opening of the cup portion 154a. The flange 154b is sandwiched in a U-shaped inside of the flange 153b of the lower flange member 153 and attached to the flange 153b.

A flange 153d is disposed above the oil inlet 151d, but the flange 153d may be provided at the same height as that of the oil inlet 151d or may be provided at the oil inlet 151d.

In the drain bolt 135, a hollow portion 135g is provided in the shaft 135a.

When the external thread 135c of the drain bolt 135 is screwed to an internal thread 29s, the sealability between the bottom wall 29f and the drain bolt 135 is secured by the seal member 156. The internal thread 29s is formed on the bottom wall 29f of the case lower portion 24. Further, the mesh filter 154 is inserted into the hollow portion 135g of the drain bolt 135 and the pressing portions 135d of the drain bolt 135 push up the flange 153b of the oil strainer 147. As a result, with a reaction force generated when the upper O-ring 152 is crushed in the vertical direction, rattling between the pressing portion 135d and the flange 153b in the vertical direction is eliminated to thereby complete the support of the oil strainer 147.

In FIGS. 6 and 9, when it is assumed that an inner diameter of the internal thread 29s of the case lower portion 24 is D2, the outer diameter D1 of the flange 153b of the oil strainer 147 is smaller than the inner diameter D2. Therefore, when the drain bolt 135 is removed from the bottom wall 29f of the case lower portion 24, the oil strainer 147 can be detached through the internal thread 29s.

As described above in FIGS. 5 and 7, the internal combustion engine 10 is provided with the partition wall 29g as the baffle for reducing the undulation of the oil surface of the oil, the opening 29t is provided in the partition wall 29g, and the oil strainer 147 passes through the opening 29t. Therefore, the opening 29t of the partition wall 29g can be leveraged as a guide for installing the oil strainer 147.

As described above in FIGS. 6 and 9, the outer diameter D1 of the oil strainer 147 is smaller than the internal diameter D2 of the internal thread 29s as the threaded hole to which the drain bolt 135 is screwed. Therefore, with the removal of the drain bolt 135, the oil strainer 147 can be detached from the threaded hole (internal thread 29s) of the drain bolt 135 to the outside, thereby being capable of more easily performing maintenance.

Further, the drain bolt 135 has the pressing portions 135d as a supporting portion for supporting the oil strainer 147, and each of the pressing portions 135d is provided with the opening 135f that serves as the oil passage. As a result, the opening 135f of the pressing portions 135d can ensure the suction amount of oil.

Further, as shown in FIG. 9, the annular flange 153b is provided at the oil inlet 151d of the oil strainer 147 and the mesh filter 154 is attached to the flange 153b as the filter for preventing the suction of the foreign matter. Therefore, the mesh filter 154 can be attached at the same time when forming the flange 153b, and the productivity can be improved.

In addition, the drain bolt 135 is provided with the hollow portion 135g that opens the leading end of the drain bolt 135, the mesh filter 154 is inserted into the hollow portion 135g of the drain bolt 135, and the leading end of the drain bolt 135 is abutted against the flange 153b.

According to the configuration described above, the flange 153b supported by the drain bolt 135 supports the mesh filter 154 so that there is no need to specially provide the mesh filter support portion, and the costs can be reduced.

Further, as shown in FIGS. 7 and 8, the oil inflow port 29p is provided in the left crankcase 11L in order to connect one end portion of the oil strainer 147 to the oil passage of the left crankcase 11L, and the inner diameter D3 of the opening 29t is larger than the inflow port 29p, in more detail, the inner diameter D4 of the large diameter hole 29r.

According to the configuration described above, the oil strainer 147 can be easily inserted into the inflow port 29p while being guided by the opening 29t, and the guide performance can be improved.

Further, as shown in FIGS. 5 and 9, in the oil strainer 147, the oil inlet 151d is provided between the two bosses 29v as a pair of convex portions provided on the bottom of the crankcase 11.

According to the configuration described above, the oil reservoir can be formed between the two bosses 29v around the oil strainer 147 and the oil can be efficiently suctioned into the oil strainer 147.

The embodiment described above merely show one embodiment of the present invention, and any modifications and applications can be arbitrarily carried out without departing from the spirit of the present invention.

The present invention is not limited to the application to the motorcycles but also to vehicles other than the motorcycles.

REFERENCE SIGNS LIST

10: internal combustion engine
11: crankcase
29g: partition wall (baffle)
29p: inflow port
29s: internal thread portion (threaded hole)
29t: opening of partition wall
29v: boss portion (convex portion)
135: drain bolt
135d: pressing portion (support portion)
135f: opening
135g: hollow portion
147: oil strainer
151d: oil inlet
153b: flange
154: mesh filter (filter)
D1: outer diameter of flange
D2: inner diameter of internal thread portion (internal thread inner diameter)

The invention claimed is:

1. An oil strainer support structure for an internal combustion engine having an oil strainer,
wherein an oil inlet of the oil strainer is provided with an annular flange and the flange is fitted with a filter that reduces suction of a foreign matter,
a drain bolt is provided with a hollow portion that is open at a leading end of the drain bolt, said hollow portion being provided with a plurality of pressing portions that project from an edge of the hollow portion, wherein each of the pressing portions define an opening,
the filter is inserted in the hollow portion of the drain bolt, the pressing portions of the drain bolt abut against the annular flange, and the oil strainer is supported by the drain bolt that is provided in the internal combustion engine.

2. The oil strainer support structure according to claim 1, wherein an outer diameter of the oil strainer is smaller than an inner diameter of an internal thread of a threaded hole to which the drain bolt is screwed.

3. The oil strainer support structure according to claim 2, wherein the internal combustion engine is provided with a baffle that prevents undulation of an oil surface of oil, the baffle is provided with a baffle opening, and the oil strainer passes through the baffle opening.

4. The oil strainer support structure according to claim 1, wherein the internal combustion engine is provided with a baffle that prevents undulation of an oil surface of oil, the baffle is provided with a baffle opening, and the oil strainer passes through the baffle opening.

5. The oil strainer support structure according to claim 1, further comprising a crankcase having an oil inflow port and an oil passage, wherein the oil inflow port is formed in the crankcase in order to connect one end portion of the oil strainer to the oil passage of the crankcase, and an inner diameter of a partition wall opening is larger than a maximum inner diameter of the inflow port.

6. The oil strainer support structure according to claim 1 wherein a bottom of the crankcase has a pair of convex portions, and the oil inlet of the oil strainer is provided between the pair of convex portions.

* * * * *